(12) United States Patent
Miller et al.

(10) Patent No.: US 7,108,294 B1
(45) Date of Patent: Sep. 19, 2006

(54) COMPOSITE PIPE ASSEMBLY AND COMPONENTS

(75) Inventors: Robert F. Miller, Lafayette, CA (US); Daniel D. Freitas, Manteca, CA (US)

(73) Assignee: Pacific Roller Die Company, Inc., Hayward, CA (US)

( * ) Notice: Subject to any disclaimer, the term of this patent is extended or adjusted under 35 U.S.C. 154(b) by 0 days.

(21) Appl. No.: 10/806,657

(22) Filed: Mar. 22, 2004

Related U.S. Application Data

(60) Provisional application No. 60/456,579, filed on Mar. 21, 2003.

(51) Int. Cl.
*F16L 25/00* (2006.01)
*F16L 47/00* (2006.01)

(52) U.S. Cl. ............... 285/286.1; 285/290.1; 285/290.4; 285/331; 285/903; 285/399; 285/288.5; 285/288.6

(58) Field of Classification Search ............. 285/285.1, 285/286.1, 286.2, 288.6, 290.1, 290.3, 293.1, 285/331, 399, 400, 403, 420, 253, 903, 288.5
See application file for complete search history.

(56) References Cited

U.S. PATENT DOCUMENTS

| 103,423 | A | * | 5/1870 | Brown ................. 285/331 |
| 198,508 | A | * | 12/1877 | Dowling ............... 403/337 |
| 214,812 | A | * | 4/1879 | Clark .................. 285/331 |
| 283,975 | A | * | 8/1883 | Converse .............. 285/292.1 |
| 311,178 | A | * | 1/1885 | Duffy ................. 285/226 |
| 652,396 | A | * | 6/1900 | Lovekin ............... 285/328 |
| 1,267,313 | A | * | 5/1918 | Cook .................. 285/330 |
| 1,467,064 | A | * | 9/1923 | Oleson ................ 285/286.2 |
| 1,906,826 | A | * | 5/1933 | Smith et al. .......... 285/331 |
| 2,081,021 | A | * | 5/1937 | Smith et al. .......... 285/368 |
| 2,179,629 | A | * | 11/1939 | Hering ................ 285/290.1 |
| 2,464,744 | A | * | 3/1949 | Fennema .............. 285/330 |
| 2,606,574 | A | * | 8/1952 | Lefebvre .............. 285/55 |
| 2,867,454 | A | * | 1/1959 | Pollia ................. 285/368 |
| 2,992,838 | A | * | 7/1961 | Wallace ............... 285/21.1 |
| 3,406,986 | A | * | 10/1968 | Jennings .............. 285/21.1 |
| 3,520,561 | A | * | 7/1970 | Rininger .............. 285/24 |
| 3,977,709 | A | * | 8/1976 | Hatzis ................. 285/368 |
| 4,702,498 | A | * | 10/1987 | Mueller et al. ........ 285/55 |
| 4,763,932 | A | * | 8/1988 | Matz et al. ........... 285/148.17 |
| 5,401,062 | A | * | 3/1995 | Vowles ................ 285/12 |
| 5,429,397 | A | * | 7/1995 | Kanao ................. 285/290.3 |
| 5,709,414 | A | * | 1/1998 | Bailey et al. ......... 285/242 |
| 5,876,070 | A | * | 3/1999 | McNealy et al. ....... 285/55 |
| 5,944,362 | A | * | 8/1999 | Harle ................. 285/148.14 |
| 2003/0127848 | A1 | * | 7/2003 | Campbell .............. 285/16 |

FOREIGN PATENT DOCUMENTS

JP     2-8588     *  1/1990

* cited by examiner

Primary Examiner—James M. Hewitt
(74) Attorney, Agent, or Firm—Philip A. Dalton

(57) ABSTRACT

A plastic coupling for joining two metal pipe sections end-to-end to form a pipe assembly. A first plastic spigot cuff is formed along the periphery of the end of the first pipe and a mating second plastic bell cuff is formed along the periphery of the end of the second pipe, such that the first and second cuffs form a bell and spigot joint with the first, spigot cuff inserted into and joined to the second, bell cuff.

4 Claims, 3 Drawing Sheets

COMPOSITE PIPE ASSEMBLY AND COMPONENTS

This application claims priority to U.S. provisional application No. 60/456,579, filed Mar. 21, 2003, entitled PLASTIC COUPLING FOR METAL PIPE.

BACKGROUND OF THE INVENTION

1. Field of the Invention

The present invention relates to couplings for joining pipe ends and in particular to couplings for metal pipes.

2. Description of the Related Art

As used here, the word "coupling" and the phrase "pipe coupling" refer to components for joining pipe or tube sections, especially sections of metal pipe or tube, typically for the purpose of forming an extended length of pipe. The requirements for such pipe couplings include a tight, preferably leak-proof seal between the adjoining pipe ends and corrosion protection for the bare metal of the pipe ends.

SUMMARY OF THE INVENTION

In one aspect, the present invention is embodied in components for joining pipe ends.

The present invention also is embodied in a coupling for joining pipe ends and in the resulting pipe joint and joined pipe sections.

In yet another aspect, the present invention is embodied in an assembly comprising pipe sections having ends joined by couplings in accordance with the present invention.

In another aspect, the present invention is embodied in a composite, metal and plastic pipe assembly, comprising: first and second metal pipes having respective first and second ends; a first plastic cuff positioned around the circumference of the first pipe end, the first cuff having an annular groove defined between radially inner and outer walls of the first cuff and extending in a longitudinal direction of the first pipe and receiving the first pipe end therein; a second plastic cuff positioned around the circumference of the second pipe end, the second cuff having an annular groove defined between radially inner and outer walls of the second cuff and extending in a longitudinal direction of the second pipe and receiving the second pipe end therein; the first cuff forming a spigot member extending around the circumference of the first pipe end and the second cuff forming a bell member extending around the circumference of the second pipe end; and substantially the entire first cuff being inserted into the second cuff, thereby forming a mating bell and spigot. In an additional aspect, the pipe assembly further comprises a plastic coating formed on the first pipe; a plastic coating formed on the second pipe; a first plastic weld joining the first plastic cuff to the plastic coating on the end of the first pipe; and a second plastic weld joining the second plastic cuff to the plastic coating on the end of the second pipe. In still another aspect, the first plastic cuff comprises a metal core embedded therein and the second plastic cuff comprises a metal core embedded therein.

In a further aspect, the present invention is embodied in components for a composite metal and plastic pipe assembly, comprising: first and second metal pipes having respective first and second ends; a plastic spigot cuff formed around the circumference of the first pipe end, the plastic spigot cuff having an annular groove defined between radially inner and outer walls of the plastic spigot cuff and extending in a longitudinal direction of the first pipe and receiving the first pipe end therein, and a plastic bell cuff formed around the circumference of the second pipe end, the plastic bell cuff having an annular groove defined between radially inner and outer walls of the plastic bell cuff and extending in a longitudinal direction of the second pipe and receiving the second pipe end therein, the sizes of the bell and spigot cuffs being adapted for inserting substantially the entire spigot cuff into the bell cuff to thereby form a coupling between the spigot cuff and the bell cuff and between the first metal pipe and the second metal pipe when the spigot cuff is inserted into the bell cuff.

BRIEF DESCRIPTION OF THE DRAWINGS

The present invention is described with respect to the following drawings.

DETAILED DESCRIPTION

Figure 2:
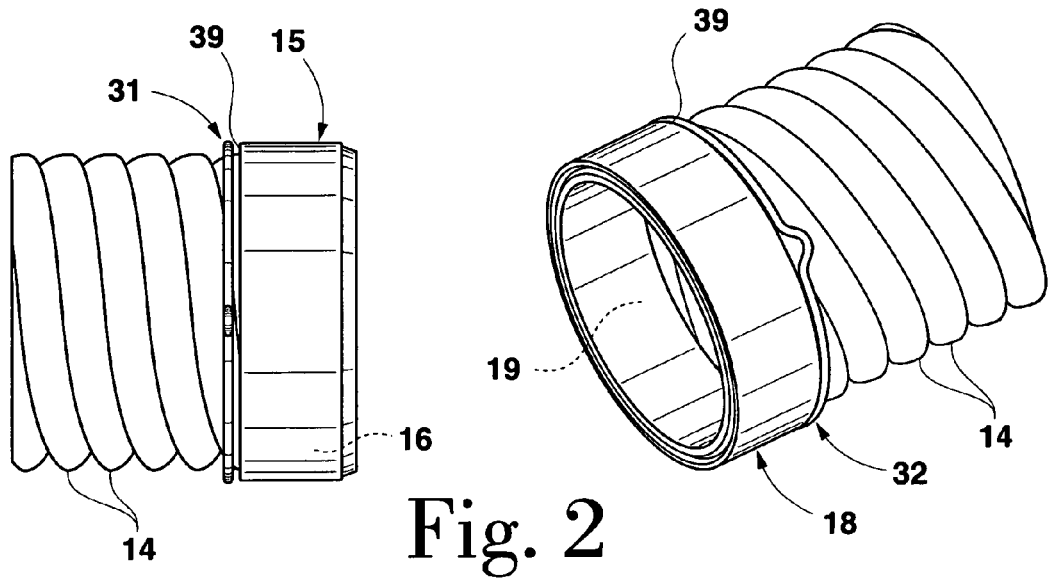
FIG. 2 is an exploded view of components of the pipe assembly of FIG. 1, including the two pipe sections, prior to joinder using the coupling of FIG. 1, and further depicts wire hoops and plastic cuffs that are components of the coupling.
Figure 1:
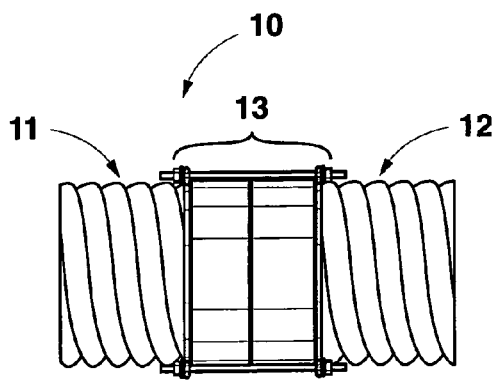
FIG. 1 is a perspective view of a pipe assembly in accordance with an embodiment of the present invention.

FIG. 1 depicts a pipe assembly 10 comprising sections spiral corrugated pipes or pipe sections 11 and 12 which are joined by coupling 13, and FIG. 2 depicts the pipe sections of FIG. 1 prior to assembly. The illustrated pipe section 11 comprises spiral corrugations 14 and has a cuff 15 formed on end 16 thereof. The pipe section 12 comprises corrugations 14 and has cuff 18 formed on end 19 thereof. The invention is also applicable to smooth wall pipe.

Figure 5:
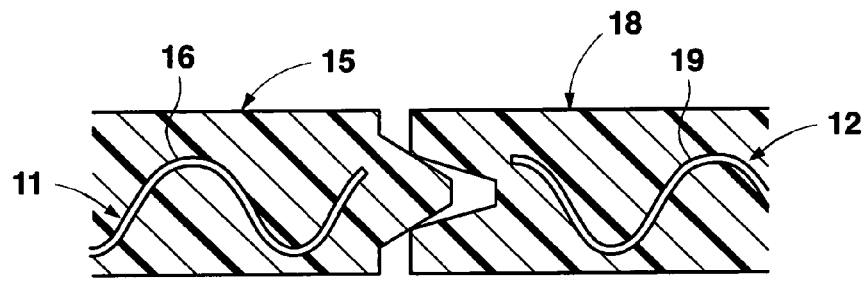
FIG. 5 depicts a cross section through the lips of the cuffs that are mounted on the pipe ends, and schematically shows the mating of the cuffs as the pipe of FIG. 1 (also FIG. 2) is being formed.

The mating cuffs 15 and 18 have tongue and groove configurations, respectively. See FIG. 5. Preferably, cuffs 15 and 18 are formed of plastic material such as polyethylene. The cuffs 15, 18 are molded in place with formed tongue and groove. The pipe ends 16, 19 are embedded in the molded plastic cuffs.

Figure 3:
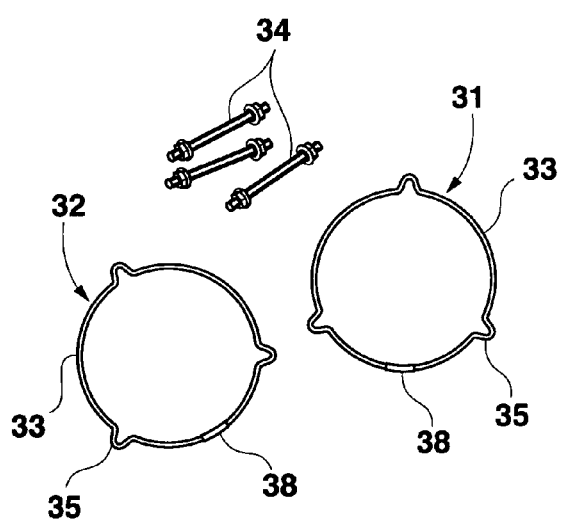
FIG. 3 depicts components of the coupling of FIGS. 1 and 2, in particular the wire hoops and bolts of the coupling.

The couplings 13 include wire hoop assemblies 31 and 32 (also called wire wraps), which are depicted separately in FIG. 3 and are shown mounted on the mating pipe sections 11 and 12, respectively, in FIGS. 1 and 2. In the depicted embodiment, the couplings 13 comprise cuffs 15 and 18 and hoop assemblies 31 and 32, although components of different size and/or shape can be used. As shown, hoop assemblies 31 and 32 can be identical or similar.

The illustrated hoop assemblies 31 and 32 comprise generally circular wire hoops 33 having one or more (typically a plurality of) bolt-receiving peripheral loops 35–35 formed integrally with or joined to the associated hoop and lying generally in the plane of the associated hoop for receiving fasteners such as bolts 34. The illustrated bolts 34 are oriented approximately parallel to the longitudinal axis of the pipe and are used to tighten the pipe sections axially, parallel to the longitudinal axis, for compressing the cuffs and securely joining the pipe sections 11 and 12. See FIGS. 1 and 6.

The hoop assemblies 31 and 32 depicted in FIG. 3 are welded, that is, the hoops 33 are formed with a gap and the ends of the hoop at the gap are joined together by a weld 38, typically after the hoops are mounted on the pipe ends 16 and 19. However, the hoops 33 can be mounted on the pipe ends either before or after the cuffs 15 and 18 are applied, but are conveniently mounted on the pipe ends in the shop before the cuffs are applied and the ends are assembled. See FIG. 2.

As shown in FIG. 2, the cuffs 15 and 18 can be formed with shoulders or lips 39 against which the hoops 33 are seated. The shoulders permit the use of hoops of a size such that the hoops fit snugly on the pipes but are sufficiently loose to permit rotation for alignment with one another.

Figure 6:
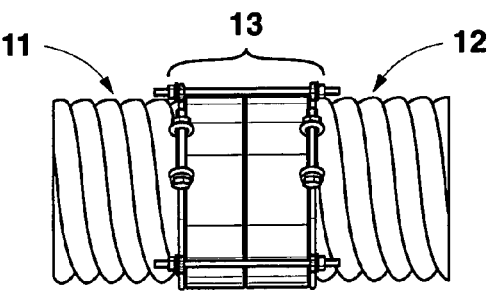
FIG. 6 is a perspective view, in the manner of FIG. 1, of a pipe assembly in accordance with another embodiment of the present invention, one using bolted wire rings or hoops.
Figure 4:
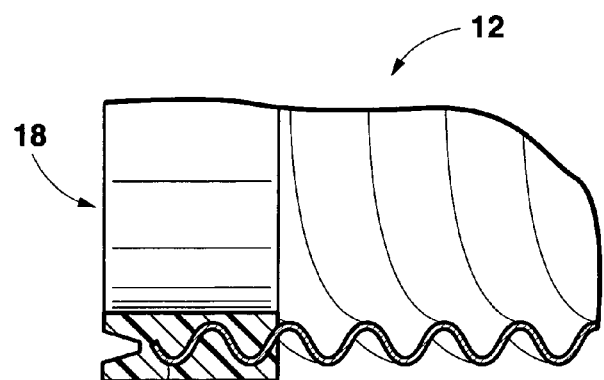
FIG. 4 depicts an end of one of the pipe sections that is cut away to effect a cross-section view showing the shape of the cuff and the mounting of the cuff on the pipe end.
Figure 7:
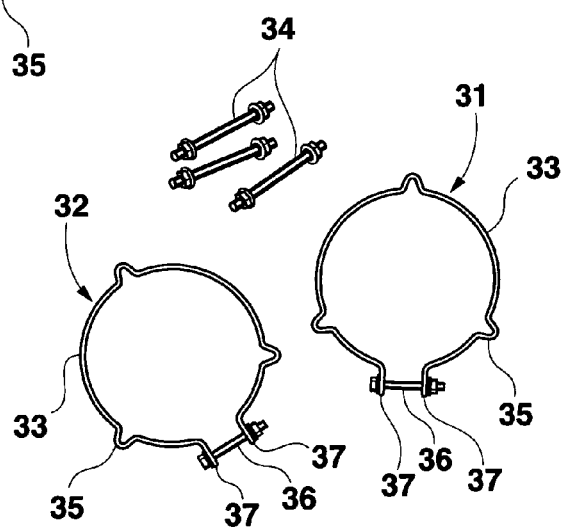
FIG. 7 depicts components of the coupling of FIG. 6, in particular, the wire hoops and bolts of the coupling.

FIGS. 6 and 7 depict an alternative set of wire hoop assemblies 31, 32. Each of the hoops 33 illustrated in FIG. 7 has a gap therein and a bolt loop 37 formed or attached at each end of the hoop adjacent the gap. The loops 37 extend transverse to the plane of the associated hoop in the illustrated embodiment, preferably along planes approximately radial to the associated hoop so that a bolt 36 can be inserted through the loops for tightening the hoop against the pipe periphery to securely mount the hoop on the pipe. The bolts 36 can be loosened to permit rotation of one or both hoops around the pipe to align the hoops and the loops 35 thereof for insertion and tightening of the bolts 34. See FIG. 6.

In one suitable sequence for joining the pipe sections 11 and 12, prior to or after forming the cuffs, the hoop assemblies 31 and 32 are positioned on the ends 16 and 19 of the respective pipe sections 11 and 12 and are secured by means such as the welded joints 38, FIGS. 1 and 3, or the bolts 36, FIGS. 6 and 7. The cuffs 15 and 18 are formed on the pipe ends 16 and 19 of the pipe sections 11 and 12. The alignment of the hoops 33 is adjusted as necessary (by simply rotating the welded version, or in the case of the bolted version, by loosening the nuts mounted on the ends of bolts 36 as required to permit rotation of one or both hoops, and then tightening the bolts as required) to align the loops 35 of hoop assembly 31 with the loops 35 of hoop assembly 32. Bolts 34–34 are inserted through the aligned pairs of loops 35–35 and nuts are threaded onto the ends of each bolt and threaded further onto the bolt to tighten the pipe ends 16 and 19 against the cuffs 15 and 18. This tightening of the bolts 34 securely joins the pipe sections together and compresses the cuffs 15 and 18 together and against the pipe ends to provide a positive, leak-proof, corrosion-resistant joint.

The couplings 13 are readily mounted on the pipe sections, readily aligned, and readily removed, and the alignment is readily adjusted. The process of coupling is accomplished using bolts, nuts and either welded wire rings/hoops or bolted wire rings/hoops, or equivalent simple hardware. In addition, despite the simple, inexpensive, easy-to-use structure and construction, the couplings provide secure, leak-proof joinder of the pipe sections.

In an alternative to loops which are formed integral with the wire hoops 33, the loops 35 and/or 37 can be separate members which are bolted or welded to the hoops.

As described, for spiral corrugated metal pipe, the present invention is embodied in wire wraps using means such as welds or bolts to hold the wires on the pipe ends and bolts to pull and hold the two pipe ends together to form a positive joint with the cuffs.

As alluded to above, the present invention is also applicable to other types of pipes, including smooth wall pipes and the wire wraps can be placed on the pipes prior to placing other materials such as cuffs on the pipe ends.

As indicated above, the sealing gaskets or cuffs according to the present invention are molded onto smooth or corrugated pipe ends, and embed the bare, cut-off pipe ends in a protective cocoon of plastic which provides corrosion protection. Molded plastic can be formed by rotating the associated pipe end and laying on extruded plastic bead around the circumference of the pipe end. Then the excess material built up on the end can be folded over into the interior of the pipe. After set up, the resulting plastic "globs" are machined to provide neater looking end(s). Care is taken not to place too much material into the interior diameter of the pipe, because excess material can impede and restrict flow within the pipe.

Preferably, to form the cuffs used here, inside and outside mold dies are used. Molten or semi-molten plastic is extruded to fill the void between the inside and outside dies, then under pressure the dies clamp and push the semi-molten extruded material into the cavities in the mold dies to create the tongue and groove profile or other selected profiles. The use of inside/outside dies under pressure moves the necessary plastic material to the outside of the pipe and a reduced amount of material to the inside diameter of the pipe sufficient to embed the pipe end and provide the necessary corrosion protection.

In one of the pipe forming techniques used by the assignee, three layer polyethylene is coated onto a metal strip, top and bottom, before the strip is formed into smooth wall or corrugated pipe. Such a plastic coated pipe is compatible with plastic welding and plastic welding to a variety of profiles and with a variety of cuffs and other plastic components of couplings.

Figure 8:
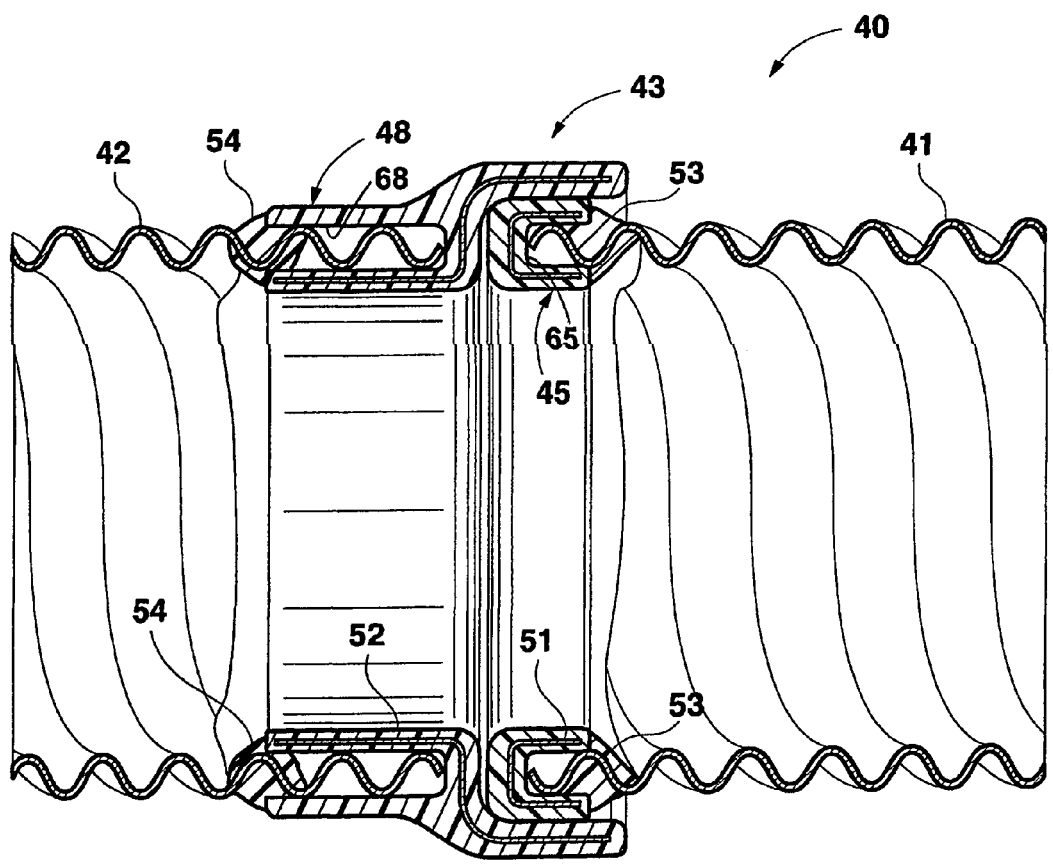
FIG. 8 is a cross section representation of yet another embodiment of the present invention, a pipe assembly incorporating a bell and spigot coupling.

One such profile is used in pipe 40, FIG. 8. This figure depicts a bell and spigot coupling 43 which joins corrugated pipe ends or sections 41 and 42. The coupling 43 comprises plastic spigot cuff 45 and plastic bell cuff 48. The cuffs 45 and 48 optionally and preferably include metal cores 51 and 52, respectively. The spigot and bell cuffs 45 and 48 are formed on the corrugated pipe ends 41 and 42 as described above. The plastic spigot cuff 45 has an annular groove 65 defined therein between radially inner and outer walls of the plastic spigot cuff and extending in a longitudinal direction of the first pipe end 41. The annular groove 65 receives the first pipe end. Similarly, the plastic bell cuff 48 has an annular groove 68 defined therein between radially inner and outer walls of the plastic bell cuff and extending in a longitudinal direction of the second pipe end 42. The annular groove 68 receives the second pipe end. Substantially the entire spigot cuff 45 is received within the bell cuff 48. The plastic spigot cuff 45 and the plastic bell cuff 48 are joined to their respective pipe ends by joints 53 and 54. Conveniently, when plastic coated pipes are used, as described above, these joints are plastic welds. Other types of joints can be used, such as bolts or rivets, but plastic welds are preferred. Also, wire hoops such as or similar to 31 and 32 can be used to augment the couplings 43 and can be used in conjunction with cuffs having shoulders similar to the shoulders 39, FIG. 2. The couplings 43 are applicable to a variety of pipes and pipe sizes.

Having thus described pipe couplings, pipe assemblies using the couplings and methods for forming and installing the couplings, all in accordance with the present invention, those of usual skill in the art will adapt the invention to other embodiments and derive other embodiments, limited solely by the claims appended hereto.

What is claimed is:

1. A composite, metal and plastic pipe assembly, comprising: first and second metal pipes having respective first and second ends; a first plastic cuff positioned around the circumference of the first pipe end, the first cuff having an annular groove defined between radially inner and outer walls of the first cuff and extending in a longitudinal direction of the first pipe and receiving the first pipe end therein; a second plastic cuff positioned around the circumference of the second pipe end, the second cuff having an annular groove defined between radially inner and outer walls of the second cuff and extending in a longitudinal direction of the second pipe end and receiving the second pipe end therein; the first cuff forming a spigot member extending around the circumference of the first pipe end and the second cuff forming a bell member extending around the circumference of the second pipe end; and substantially the entire first cuff being inserted into the second cuff, thereby forming a mating bell and spigot coupling.

2. The pipe assembly of claim 1, further comprising: a plastic coating formed on the first pipe; a plastic coating formed on the second pipe; a first plastic weld joining the first plastic cuff to the plastic coating on the end of the first pipe; and a second plastic weld joining the second plastic cuff to the plastic coating on the end of the second pipe.

3. The pipe assembly of claim 1, the first plastic cuff having a metal core embedded therein and the second plastic cuff having a metal core embedded therein.

4. Components for a composite metal and plastic pipe assembly, comprising: first and second metal pipes having respective first and second ends; a plastic spigot cuff formed around the circumference of the first pipe end, the plastic spigot cuff having an annular groove defined between radially inner and outer walls of the plastic spigot cuff and extending in a longitudinal direction of the first pipe and and receiving the first pipe end therein, and a plastic bell cuff formed around the circumference of the second pipe end, the plastic bell cuff having an annular groove defined between radially inner and outer walls of the plastic bell cuff and extending in a longitudinal direction of the second pipe and and receiving the second pipe end therein, the sizes of the bell and spigot cuffs being adapted for inserting substantially the entire spigot cuff into the bell cuff to thereby form a coupling between the spigot cuff and the bell cuff and between the first metal pipe and the second metal pipe when the spigot cuff is inserted into the bell cuff.

* * * * *